(12) United States Patent
Lott

(10) Patent No.: US 10,719,490 B1
(45) Date of Patent: Jul. 21, 2020

(54) FORENSIC ANALYSIS USING SYNTHETIC DATASETS

(71) Applicant: Capital One Services, LLC, McLean, VA (US)

(72) Inventor: Steven Lott, Tysons Corner, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/721,387

(22) Filed: Dec. 19, 2019

(51) Int. Cl.
| | | |
|---|---|---|
| *G06F 7/00* | (2006.01) | |
| *G06F 16/21* | (2019.01) | |
| *G06F 17/18* | (2006.01) | |
| *G06F 16/22* | (2019.01) | |
| *G06F 16/215* | (2019.01) | |

(52) U.S. Cl.
CPC .......... *G06F 16/212* (2019.01); *G06F 16/213* (2019.01); *G06F 16/215* (2019.01); *G06F 16/2282* (2019.01); *G06F 17/18* (2013.01)

(58) Field of Classification Search
CPC .. G06F 16/212; G06F 16/215; G06F 16/2282; G06F 16/213; G06F 17/18
USPC ................................................ 707/600–899
See application file for complete search history.

(56) References Cited

U.S. PATENT DOCUMENTS

| | | |
|---|---|---|
| 10,115,083 B1 | 10/2018 | Koeppel |
| 2014/0279838 A1 | 9/2014 | Tsirogiannis et al. |
| 2014/0282470 A1 | 9/2014 | Buga et al. |
| 2015/0026223 A1 | 1/2015 | Hahn et al. |
| 2015/0356123 A1 | 12/2015 | Gorelik |
| 2016/0026692 A1 | 1/2016 | Cannaliato et al. |
| 2016/0224594 A1 | 8/2016 | Chow et al. |
| 2016/0275201 A1 | 9/2016 | Li et al. |
| 2017/0060894 A1 | 3/2017 | Gorelik |
| 2017/0169061 A1 | 6/2017 | Cao et al. |
| 2017/0206256 A1 | 7/2017 | Tsirogiannis et al. |
| 2018/0018353 A1 | 1/2018 | Morrison et al. |
| 2018/0349463 A1 | 12/2018 | Bernhardy et al. |
| 2019/0073388 A1 | 3/2019 | Desmarets |

*Primary Examiner* — Isaac M Woo
(74) *Attorney, Agent, or Firm* — Banner & Witcoff, Ltd.

(57) ABSTRACT

A system, method, and computer-readable medium for generating synthetic data are described. Improved data models for databases may be achieved by improving the quality of synthetic data upon for modeling those databases and for checking the authenticity of existing numerical data. According to some aspects, these and other benefits may be achieved by using numeric distribution information in a schema describing one or more numeric fields and, based on that schema, distribution-appropriate numerical data may be generated. Also, another schema may be used to generate a second set of numerical data having a different distribution that is not expected for the one or more numeric fields. Actual data may be compared against the generated datasets. When the actual data is determined to be statistically similar to the second numerical dataset, an alert may be generated. A benefit includes finding potentially fraudulent datasets using an efficient approach.

19 Claims, 10 Drawing Sheets

```
"first name": {"type": "string"},
"last name": {"type": "string"},
"address": {
  "type": "object",
  "properties": {
    "house/apartment number": {"type": "integer", "minimum": 1, "maximum": 9000000, "x-distribution": "benford"},
    "unit": {"type": "string"},
    "street address": {"type": "string"},
    "city": {"type": "string"},
    "state": {"type": "string", "maxLength": 2, "x-domain": "letters"},
    "postal code": {"type": "integer", "minimum": 0, "maximum": 99999, "x-distribution": "uniform"}
  }
},
"accounts": {
  "type": "array",
  "items": {
    "type": "object",
    "properties": {
      "account number": {"type": "string", "x-domain": "digits", "maxLength": 12},
      "CVV number": {"type": "integer", "x-distribution": "uniform", "minimum": 99, "maximum": 999}
    }
  }
}
```

FIG. 9

```
class CaseStudy(Model):
    SCHEMA = {
        "title": "Case Study Sample Data",
        "description": """
            ## severity -- one of "error", "exception", "info"
            ## timestamp -- YYYY:mm:ddTHH:MM:SS.FFFFFF
            ## ip_address -- IPV4
            ## tag -- Name:name
            ## aws_region -- US-East-1
            ## duration -- floating-point number
        """,
        "type": "object",
        "properties": {
            "severity": {"type": "string", "enum": ["error", "exception", "info"]},
            "timestamp": {"type": "string", "format": "date-time",
                    "x-minimumDate": "2018-01-01T00:00:00",
                    "x-maximumDate": "2019-01-01T00:00:00"},
            "ip_address": {"type": "string", "format": "ipv4"},
            "tag_array": {
                "type": "array",
                "items": {
                    "type": "object",
                    "properties": {
                        "name": {"type": "string", "const": "Name"},
                        "value": {"type": "string", "x-domain": "word"}
                    },
                },
                "minItems": 1,
                "maxItems": 1
            },
            "aws_region": {"type": "string", "enum": ["us-east-1", "us-west-1"]},
            "duration": {"type": "number", "minimum": 0, "maximum": 10,
                    "x-distribution": "triangular", "x-mode": 0.1},
        }
    }
```

FIG. 10

FORENSIC ANALYSIS USING SYNTHETIC DATASETS

RELATED APPLICATIONS

This application is related to the following U.S. patent application Ser. No. 16/721,298, by Steven Lott, entitled "Schema Validation with Data Synthesis", also filed on Dec. 19, 2019. The entirety of the related application is incorporated by reference herein for all purposes.

FIELD OF USE

Aspects of the disclosure relate generally to databases. More specifically, aspects of the disclosure may provide for enhanced creation and maintenance of one or more data models and their related databases.

BACKGROUND

As companies grow and change, databases grow and change with them. To plan for future changes to databases, developers have attempted to plan databases around expected growth patterns including, but not limited to, number of characters in a street address, number of digits for transaction amounts, number of characters in user names, and the like. In addition to planning for the number of characters to budget for a given field, growth of indices for databases may be planned as well. An issue that exists with planning for database and/or index growth is the sample data upon which the databases and/or indices are based. Individual characteristics of a given sample dataset may result in database planning going awry as those individual characteristics in the sample data may be mistakenly interpreted by developers as a pattern in global data. The future plan for the database and/or index may be incorrectly biased by over-emphasizing the outliers in the sample data.

Aspects described herein may address these and other problems, and generally improve the quality, efficiency, and speed of modeling database systems by offering improved processes for improving sample data upon which databases and/or indices may be modeled.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for generating synthetic data. Improved data models for databases may be achieved by improving the quality of synthetic data upon which those databases are modeled. According to some aspects, these and other benefits may be achieved by using stored numeric distribution information in a schema describing one or more numeric fields and, based on that schema, distribution-appropriate numerical data may be generated. The schema may describe the distributions of the numeric fields through notations applicable to the schema including, for example, as object or other components of the relevant schema. The schema may be compared against actual data and the schema adjusted to more closely match the actual data. In implementation, this may be effected by storing a schema with distribution information and/or one or more parameters, generating synthetic numerical data based on the schema, comparing the synthetic data to the actual data, and, based on the comparison, modify the schema. Next, the new synthetic data may be compared with the actual data and the schema repeatedly modified until the synthetic data is statistically similar to the actual data. Additionally or alternatively, the synthetic data may be compared with actual data to determine whether the actual data represents genuine data or fraudulent data by determining whether the actual data is statistically expected based on the synthetic data. The comparison between synthetic datasets and actual datasets may be performed using the chi-squared statistical tests or other tests that compare two or datasets, including or not including distribution information. A benefit includes improved database performance and indexing based on using repeatable, statistically appropriate, synthetic data.

Further, aspects described herein may provide for easier generation of statistically accurate synthetic data and being able to create accurate synthetic data based on changes in actual data. Additionally, the synthetic data may be compared against actual data to, in some instances, determine whether the actual data may be fraudulent or may include fraudulent records.

More particularly, some aspects described herein may provide a computer-implemented method for creating or modifying synthetic data based on a schema describing the synthetic data with the schema specifying one or more of a distribution of the numeric data or a parameter. The method may comprise: reading a first file, the first file containing a first schema definition, the first schema definition including a first definition specifying a first property identifying a type of numerical distribution of values; and a second definition specifying a second property identifying a characteristic; generating, using a number generator, first numerical data conforming to the type of numerical distribution specified in the first property and the characteristic specified in the second property; reading, from a first database, second numerical data comprising one or more records; determining a distribution of the second numerical data; comparing the first numerical data and the second numerical data by: comparing each record of the second numerical data to the characteristic of the first numerical data; comparing the distribution of the second numerical data to the distribution of the first property; and comparing an aggregate of all records of the second numerical data to the distribution of the first numerical data; determining whether the second numerical data is statistically different from the first numerical data; generating an alert identifying the second numerical data is statistically different from the first numerical data; modifying, based on determining that the second numerical data is statistically different from the first numerical data, the second definition; generating, using the number generator and based on the modified definition of the second definition and based the first definition, third numerical data; and modifying fields of a second database based on the third numerical data.

Additionally or alternatively, some aspects described herein may provide a computer-implemented method for creating or modifying synthetic data based on a schema describing the synthetic data with the schema specifying one or more of a distribution of the numeric data or a parameter and further comparing and modifying the schema to conform to the distribution of an existing database. The method may comprise: reading a first file, the first file containing a first schema definition, the first schema definition including a first definition specifying a first object, the first object having a first property identifying a type of numerical distribution of values and a second definition specifying a second object, the second object having a second property identifying a range of numbers; reading a second file, the second file including distribution parameters defining the type of numerical distribution specified in the first property; generating, using a number generator, first numerical data conforming to the type of numerical distribution specified in the first property, the range specified in the second property, and the distribution parameters; reading second numerical data from an existing database; comparing the first numerical data and the second numerical data; and modifying the first schema definition of the first file to conform to the distribution of the numerical data of the existing database.

Additionally or alternatively, some aspects described herein may provide a computer-implemented method for creating or modifying first numerical data based on a schema describing the synthetic data with the schema specifying one or more of a distribution of the numeric data or a property and further modifying, based on a comparison of the first numerical data and numerical data from an existing database, a structure of a database. The method may comprise: reading a first file, the first file containing a first schema definition, the first schema definition comprising a first definition specifying a first object, the first object having a first property identifying a type of numerical distribution of values and a second definition specifying a second object, the second object having a second property identifying a range of numbers; generating, using a number generator, first numerical data conforming to the type of numerical distribution specified in the first property and the range specified in the second property; reading, from an existing database, second numerical data comprising one or more records; comparing the first numerical data and the second numerical data; and modifying, based on the comparison of the first numerical data and the numerical data from the existing database, a structure of a database.

According to some embodiments, the schema definition may include a JSON schema definition, the type of numerical distribution of values may be a normal (i.e., Gaussian) distribution, a Benford distribution, a binomial distribution, a power distribution, or triangular distribution, the schema definition may include a range of numbers to be generated as a synthetic dataset and distribution parameters including a numerical mean, a numerical mode, a numerical median, a standard deviation, or the synthetic dataset may be compared with the actual dataset by comparing one or more of the distributions, numerical means, numerical modes, numerical medians, or standard deviations of the respective datasets. According to some embodiments, the generation of data may include generating data conforming one or more of an original or modified specified distribution, original or modified range or ranges, or original or modified distribution parameters.

Additionally or alternatively, some aspects described herein may provide a computer-implemented method for determining whether an obtained dataset is statistically similar or statistically different from a first generated dataset and is statistically similar or statistically different from a second generated dataset. The method may comprise: receiving an identification of a first field of a database, the first field representing actual data and the identification including a first numerical distribution and a first characteristic; receiving a first dataset having data identified by the first field; receiving a first schema with the first numerical distribution and the first characteristic; generating, based on the first schema, a second dataset having the first numerical distribution and the first characteristic, the second dataset comprising synthetic data; receiving a second schema with a second numerical distribution and a second characteristic, wherein the second numerical distribution differs from the first numerical distribution, and wherein the second characteristic differs from the first characteristic; generating, based on the second schema, a third dataset having the second numerical distribution and the second characteristic, the third dataset comprising synthetic data; determining, for the first dataset, a third numerical distribution and a third characteristic; comparing the first dataset with the second dataset; determining, whether the first dataset is statistically different from the second dataset; comparing the first dataset with the third dataset; determining, whether the first dataset is statistically different from the third dataset; and generating, based on determining that the first dataset is statistically different from the second dataset and statistically similar to the third dataset, an alert that the first dataset does not represent actual data.

According to some embodiments, additional datasets may be created and compared to the obtained dataset and generating an alert based on one or more of the comparisons, the schemas may be JSON schemas that include a numerical distribution as part of an object definition and may include a characteristic as part of the object definition, the numerical distribution of values may be one of a normal distribution, a Benford distribution, binomial distribution, power distribution, or a triangular distribution, the comparing of datasets may include determining a number of standard deviations between the datasets, determining a numerical mode, determining a median, determining symmetry, determining skewness, or determining kurtosis, and comparing the determined values between datasets.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 9 depicts an example of pseudo-code for a schema; and

FIG. 10 depicts an example of pseudo-code for another schema.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for improving creation and/or modification of a database based on synthetic data with relevant distributions. As discussed further herein, this combination of features may allow for improved modeling of a database by basing fields and data structures on data having relevant distributions pertinent to the modeled fields.

Before discussing these concepts in greater detail, however, several examples of a computing device that may be used in implementing and/or otherwise providing various aspects of the disclosure will first be discussed with respect to FIG. 1.

Figure 1:
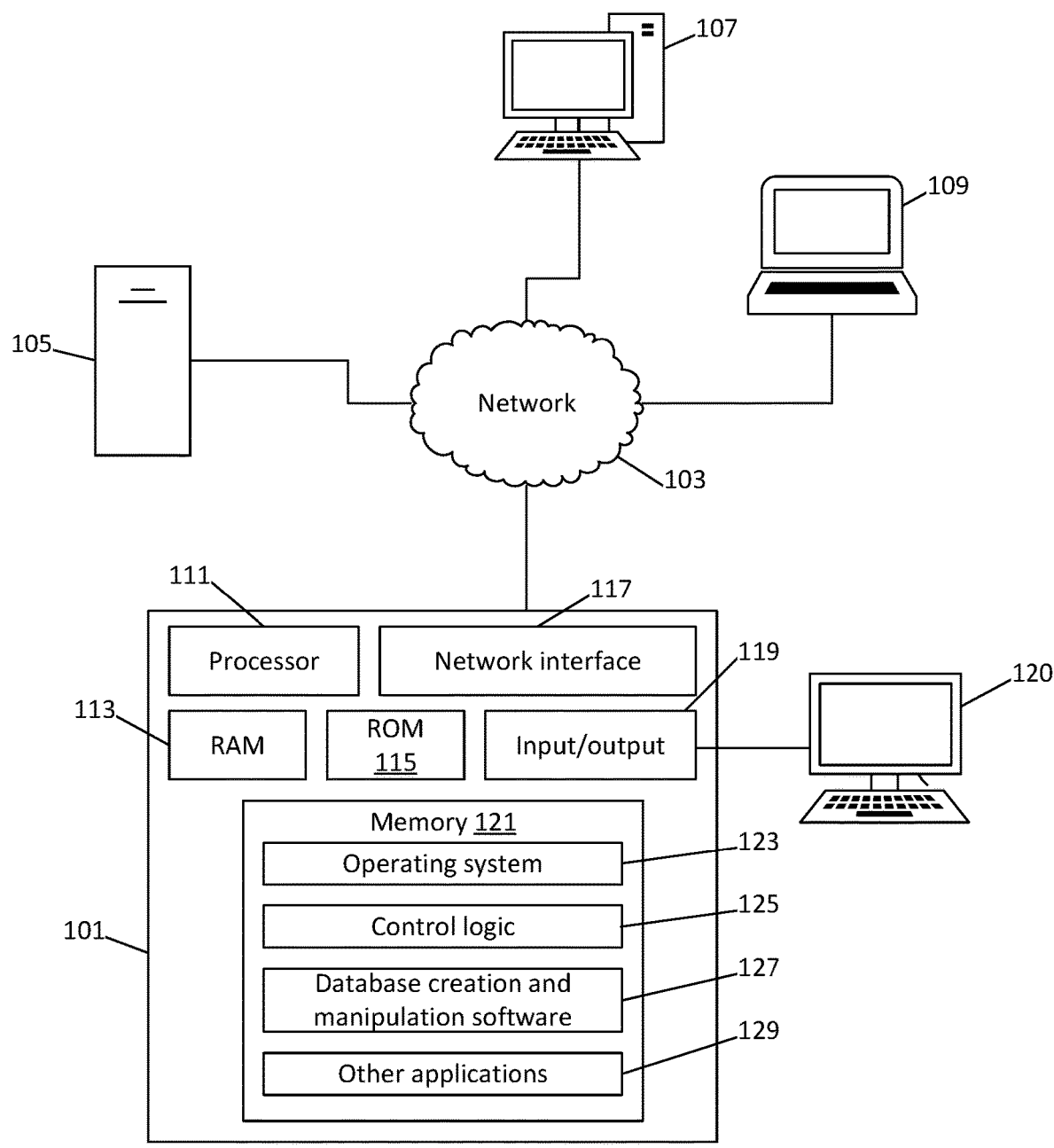
FIG. 1 depicts an example of a computing device and system architecture that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109, and other devices (not shown) may be connected to one or more of the networks via twisted pair wires, coaxial cable, fiber optics, radio waves, or other communication media. Additionally or alternatively, computing device 101 and/or the network nodes 105, 107, and 109 may be a server hosting one or more databases.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with database operations. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, database creation and manipulation software 127 and other applications 129. Control logic 125 may be incorporated in and may be a part of database creation and manipulation software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to a method for modeling a database using synthetic data having a distribution relevant to fields of the database.

Figure 2:
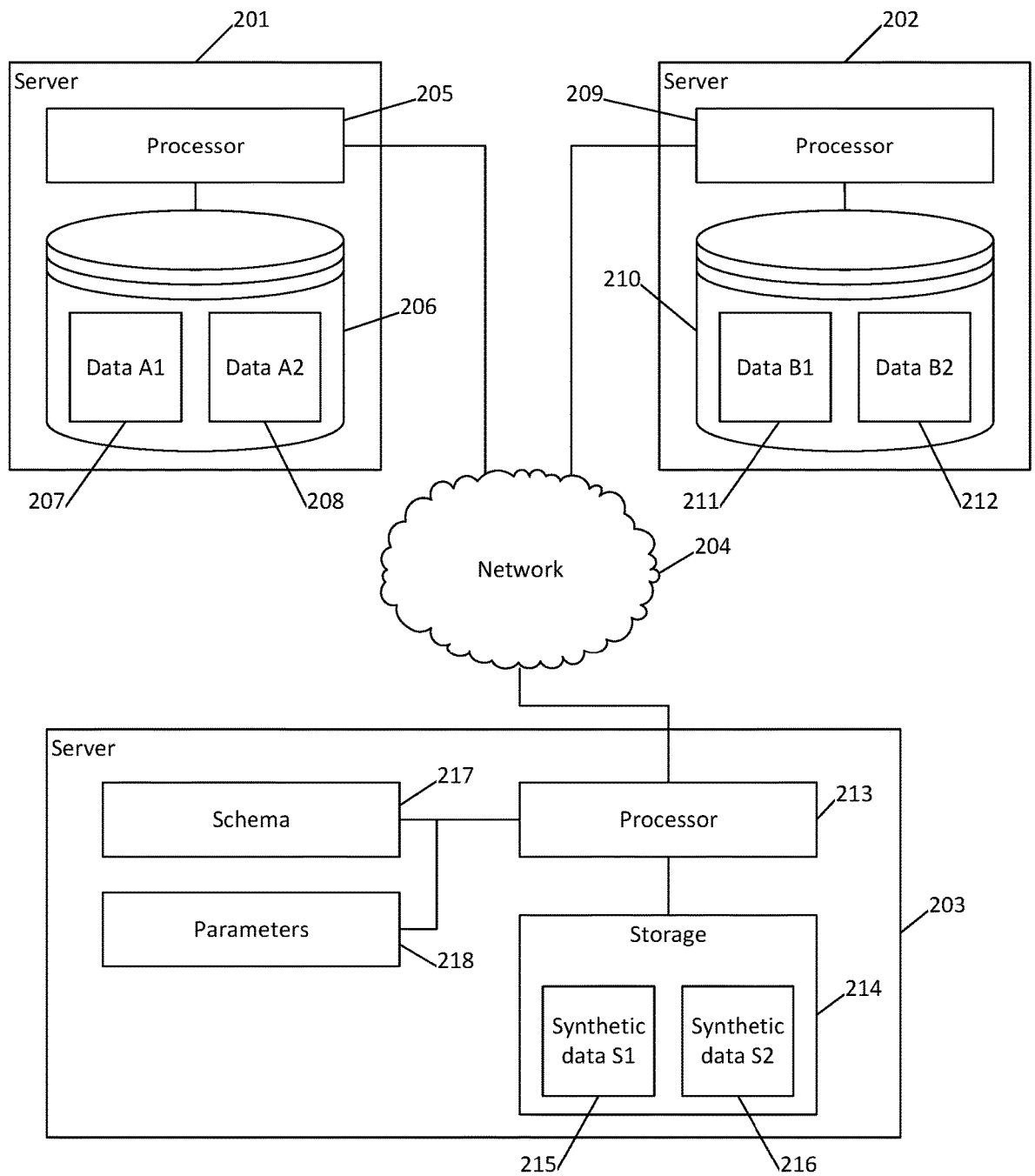
FIG. 2 depicts an example of a network comprising servers and databases.

FIG. 2 depicts an example of a network of two or more servers each supporting one or more databases having datasets. A server 201, a server 202, and a server 203 may be connected to each other via network 204. Network 204 may be represented as a single network but may comprise combinations of other networks or subnetworks.

The server 201 may include one or more processors 205, a database 206 comprising one or more source datasets. The database 206 may include data A1 207 and data A2 208. The server 202 may include one or more processors 209, a database 210 comprising one or more source datasets. The database 210 may include data B1 211 and data B2 212. The server 203 may include one or more processors 213 and a storage 214 comprising one or more sets of synthetic data, e.g., synthetic data C1 215 and synthetic data C2 216, with the synthetic data having been generated based on a schema 217 and parameters 218.

A new database may be modeled based on the synthetic data S1 215 and the synthetic data S2 216. Further, that new database, during the modeling process, may be stored in a storage associated with any of servers 201 or 202 or 203 or partitioned across multiple servers. Further, upon deployment, the new database may be stored in the existing server or servers or stored in a new server or servers. That new database may be populated with existing data from one server (e.g., from data A1 207 at server 201), populated with existing data at a common server (e.g., from data A1 207 and data A2 208 at server 201), and/or based on data from two or more servers (e.g., data A1 207 from server 201 and data B1 211 from server 202), or any combination thereof. Additionally, as some databases or tables may be partitioned in time, geographical region, and other criteria, the new database may be created from a first set of rows from a first table and a second set of rows from a second table. Further, the new database may obtain content from other new databases tables (e.g., content from data B1 211 may be used to create or append content to data A2 208).

When designing a new database, database engineers consider a number of factors that help them plan how that new database should be configured. During the designing process, a database engineer attempts to create an abstract model that organizes elements of data to be stored in the database and standardizes how those data elements relate to each other and to the properties of entities. For example, for a database relating to credit card account data, a data model may include a first data element representing an account holder and a second data element representing the billing address for that credit card account.

The term "data model" is generally used in two separate senses. In a first sense, the term refers to an abstract formulation of the objects and relationships found in a particular domain. In a second sense, the term refers to a set of concepts used to define formalizations in that particular domain. As described herein, the term "data model" may be used in both senses, as relevant to the description in context. As a variety of performance factors are tied to the data model (including but not limited to speeds of searches, adding new data, reindexing the database, and the like), correctly modeling a database often means repeatedly revising a given model prior to deployment.

To develop a given data model, database engineers use small actual datasets and then extrapolate based on parameters of those datasets. This extrapolation may create issues as oddities in the small actual datasets are unknowingly magnified and the new database modeled around those oddities. Accordingly, instead of using actual datasets, one may use synthetic data to model the database. This use of synthetic data may be fine for some numeric fields but may cause problems for other numeric fields. While some data fields may be easy to model and subsequently create an index for those data fields (e.g., a credit card verification value of three digits where the three digits have a uniform distribution), other data fields may be difficult to model based on how those data fields vary. For example, house or apartment numbers generally do not follow a uniform distribution pattern but instead follow a Benford distribution pattern. Other examples include dollar amounts, weights, measurements, and counts of objects. For reference, a Benford distribution pattern describes how the most significant digit follows a logarithmic distribution. If a developer uses synthetic data having a uniform distribution of a given range as a house number dataset, the database may be skewed to expect more house numbers and apartment numbers having a greater number of most significant digits than actually occurs in real world data. Numerical data is not limited to uniform distributions and Benford distributions but may include other frequency distributions including but not limited to normal (Gaussian), power, triangle, geometric, Bernoulli, beta-binomial, Poisson, and other distributions.

To minimize inconsistencies between small actual datasets and minimize inappropriate skewing a database model based on those inconsistencies, a database engineer may use synthetic data in datasets to replace the actual datasets where the synthetic data is expected to be close to ideal for a given numerical field. An issue with the use of synthetic data is the lack of reusability of any generated synthetic data or even the process to create the synthetic data. In other words, when a database engineer develops a process for generating synthetic data for modeling a database, that process is highly associated with that database. When turning attention to the next database, the process for generating additional synthetic data has to be re-created for that new database.

One or more aspects described herein relate to making the generation of synthetic data extensible. A schema for synthetic data generation may be extensibly used. That schema may include designation of objects including but not limited to numerical objects and a distribution associated with those objects. Additionally or alternatively, those numerical objects may include range and/or parameter information. For example, the schema may be a JSON schema, XML schema, or other schema. In general, a schema definition may include a variety of standard definitions for a field (e.g., {"type": "string"}, {"type": "integer"}, {"type": "array"}, etc.).

These standard definitions in a schema are inadequate to define the probability distributions of numerical data. One or more aspects as described herein relate to adding an object definition for numbers that defines the distribution associated with the numbers. Alternatively or additionally, an object definition for the range of numbers may be added to the schema definition.

Figure 3:
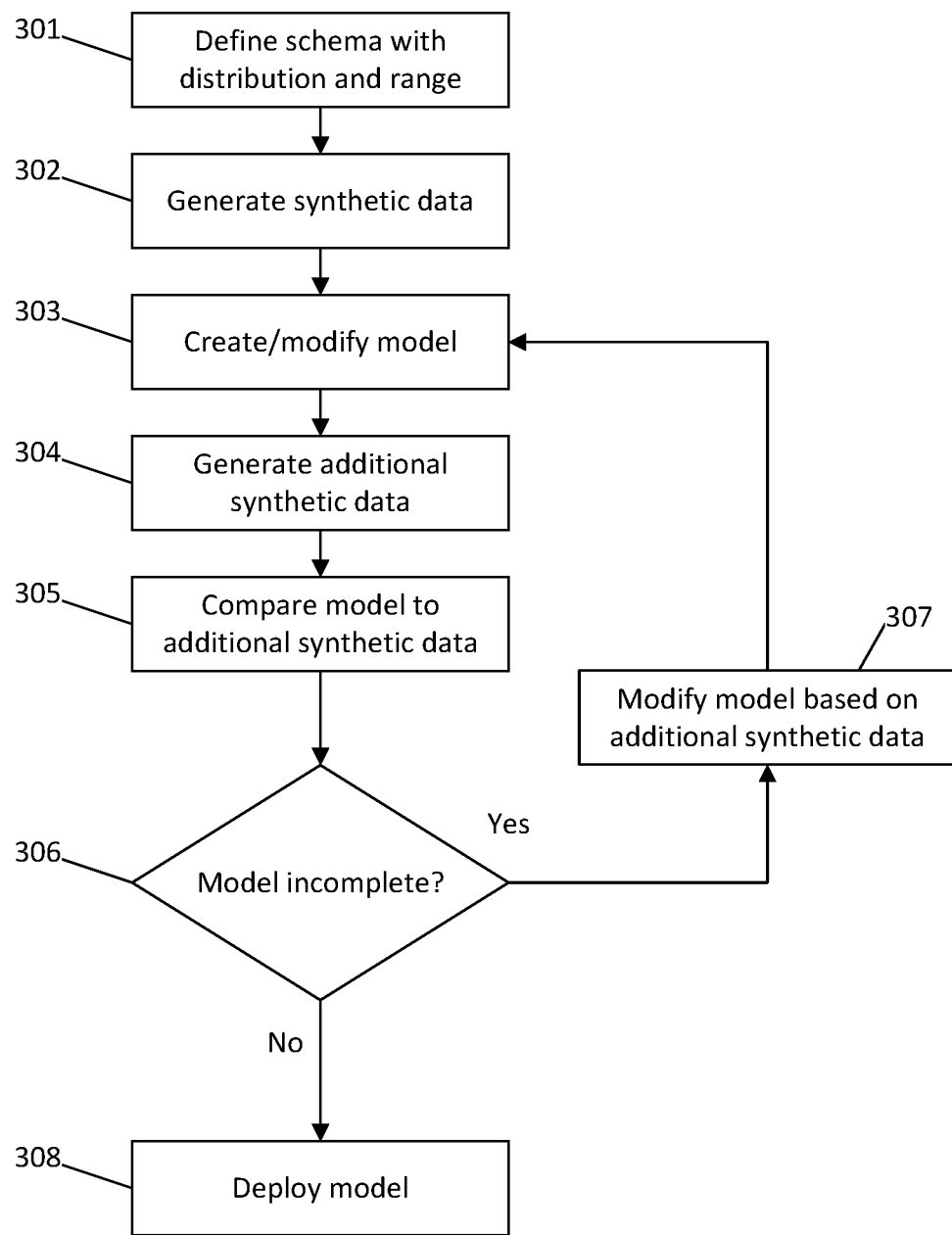
FIG. 3 depicts a flow chart for a method of generating synthetic data and modeling a database.

FIG. 3 is an example of a flowchart describing a process for creating synthetic data from a schema and modeling a database using that synthetic data. The method of FIG. 3 may be implemented by a suitable computing system, for instance, as described above with respect to FIGS. 1 and/or 2. For example, the method of FIG. 3 may be implemented by any suitable computing environment by a computing device and/or combination of computing devices, such as computing devices 101, 105, 107, and 109 of FIG. 1. The method of FIG. 3 may be implemented in suitable program instructions, such as in database creation and manipulation software 127, and may operate on a suitable data such as data from server 201 or data from server 202 or data from server 203.

At step 301, a schema for numerical data is defined. The schema may include an identification of a numerical field (e.g., "house/apartment number") and also describe a distribution for that numerical field. An example of a pseudocode for a schema relating to an account holder may be represented as shown in FIG. 9.

As an example, the "house/apartment number" field is defined as an "integer" and the "house/apartment number distribution" field is defined as a "benford" distribution with a range between 1 and 900,000. Other numerical fields are defined as integers with uniform distributions (e.g., all numbers are equally probable). Additionally or alternatively, other numerical fields may be defined having distributions other than uniform including power, triangle, geometric, Bernoulli, beta-binomial, Poisson, and other distributions.

Additionally or alternatively, the schema may further include an identification of a range and/or statistical parameters for a set of numerical values. For example, the range of values for the "CVV" may be specified as ranging from 099 to 999. With respect to statistical parameters, one or more of the following may be identified: numerical mean, numerical mode, standard deviation, and the like.

FIG. 10 provides a second example of pseudocode of a schema.

In this second example, a schema is identified for synthetic data relating to error events that include a label of the severity of the event, a timestamp of when the event occurred, an IP address of the event, and list of tags associated with the event (e.g., in the form of an array of objects having a name and value). The duration of the event is identified as having a triangle distribution pattern with values from 0 to 10 and numerical mode of 0.1. Other distribution patterns may be used and other parameters may be specified. Other parameters may include numerical mean, head, tail, median, variance, standard deviation, symmetry, skewness, kurtosis, and/or other parameters.

When synthetic data is to be generated relating to street numbers (from the first schema example) or the duration of errors in a cloud-based processing system (from the second schema), the respective schema may be used. By creating a schema to store number-related information along with a distribution for those numbers, the schema may be reused with the distribution and parameters identified in the schema. Further, the schema may be reused when generating additional synthetic data during the development of a data model for a given database as well as reused when generating synthetic data during the development of a data model for other databases.

In step 302, a processor (e.g., processor 213) may, based on the distribution, range, and/or parameters identified in the schema, generate synthetic data that comports with the definitions in the schema. In step 303, the database engineer may create a new database model or modify an existing database model based on the synthetic data generated in step 302. In step 304, the processor may generate additional synthetic data based on the schema. In step 305, the existing model may be compared to the additional synthetic data from step 304 to determine whether portions of the data model need to be modified to comport with the additional synthetic data of step 304.

If, in step 306, the model is determined to be incomplete, the model may be modified, in step 307, based on the additional synthetic data. If, in step 306, the model is determined to be complete, the model may be deployed in step 308.

Figure 4:
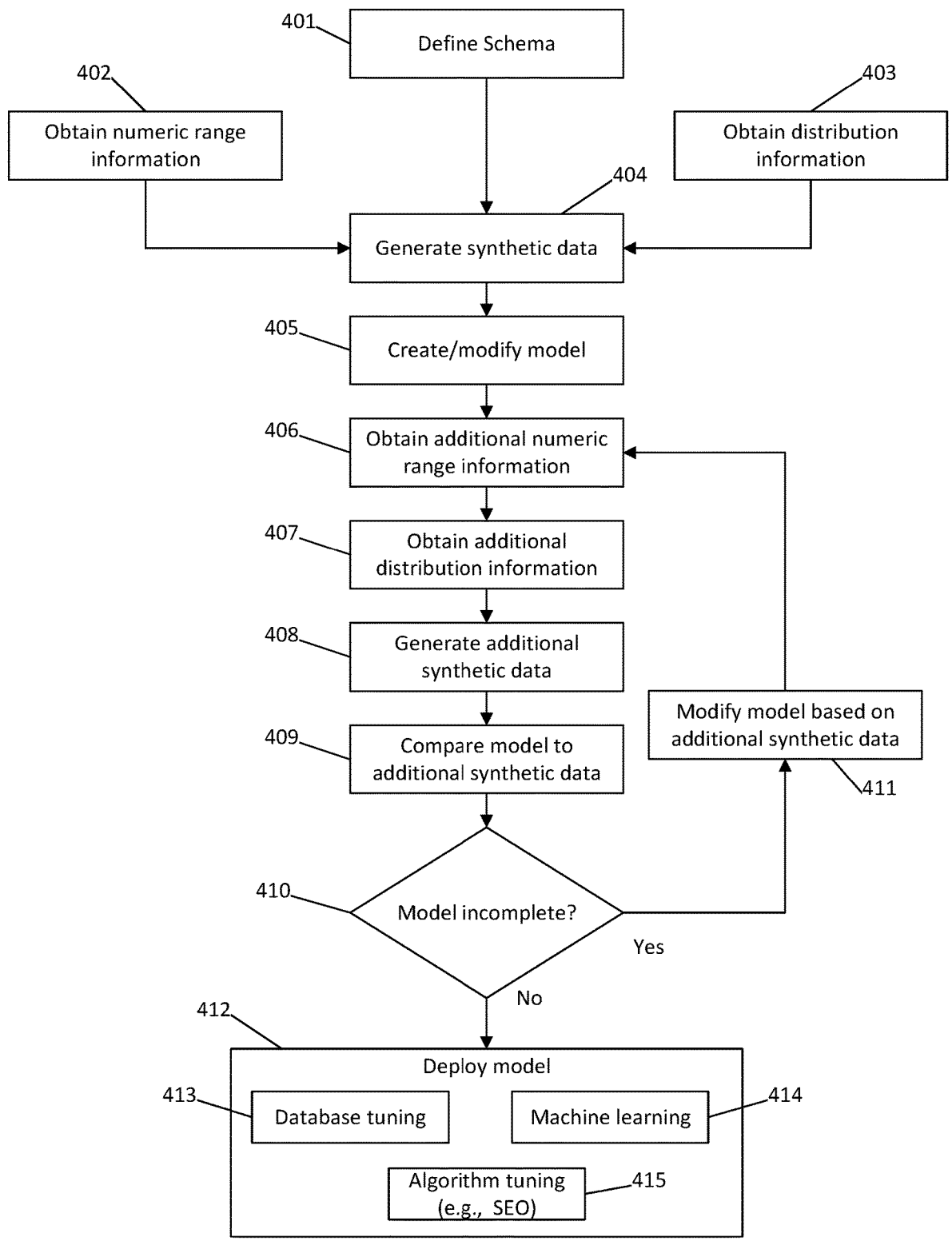
FIG. 4 depicts a flow chart for a method of generating synthetic data with numeric range and distribution information and modeling a database.

FIG. 4 depicts a flow chart for a method of generating synthetic data with numeric range and distribution information and modeling a database.

The method of FIG. 4 describes obtaining numeric range information and or distribution information separate from the schema. In step 401, a schema is defined as including the distribution for numeric values. In step 402, numeric range information is obtained separately from the obtaining of schema 401. In step 403, distribution information is obtained separately from the schema defined in step 401. Additionally or alternatively, the numeric range or the distribution information may be combined into schema 401 and obtained with it. In step 404, synthetic data is generated based on the schema, the numeric range, and the distribution information. In step 405, a new database model may be created or an existing database model modified based on newly added synthetic data. In step 406, additional numeric range information may be obtained. In step 407, additional distribution information may be obtained. In step 408, based on the additional numeric range information and the additional distribution information, additional synthetic data may be generated. In step 409, the additional synthetic data may be compared to the database model. For example, the comparison may include determining how well the model handles the additional synthetic data (e.g., timing how long the additional data takes to be loaded into the data model, timing how long join/merge operations take based on the combining of the additional synthetic data into the existing data model, and/or timing how long an index takes to be created based on the addition of the additional synthetic data, and the like).

In step 410, if the model is incomplete (the existing model performing below expectations), the model may be modified, in step 411, based on the additional synthetic data. For example, first characteristics may be determined for the original synthetic data (e.g., $mean_A$, $mode_A$, and/or $median_A$) and second characteristics may be determined for the additional synthetic data (e.g., $mean_B$, $mode_B$, and/or $median_B$). The first and second characteristics may be compared to determine whether they are statistically similar to each other (e.g., that the sample means of both are not significantly different). Determining whether the numerical means are statistically different or statistically similar may be determined by one or more statistical tests. For reference, statistically similar and statistically different may be related as mutually exclusive conclusions generally described in terms of a null hypothesis (for instance, two datasets are statistically similar). By using one or more statistical tests, one may determine whether, within a degree of certainty (e.g., 95%) that the two datasets are similar.

For example, for a normal distribution, one may perform a z-score test (e.g., performing z-test by determining how many standard deviations from $mean_A$ is $mean_B$). Next, one may compute a p-value (e.g., determining a percent chance that obtaining the z-score is possible based on the assumption that the $mean_B$ is actually no different from $mean_A$ where the difference is based on the relative small size of the additional data used to compute $mean_B$). As p decreases, one may have a greater confidence that the additional synthetic data is statistically similar to that of the original synthetic data. The threshold level of p to consider the numerical means statistically different may be described as $\alpha$. Where $\alpha=0.05$ (or 5%), values of $p>\alpha$ represent that the distributions are statistically similar and values of $p<\alpha$ represent that the distributions are statistically different. In the context of comparing the original synthetic dataset and the additional synthetic dataset, values of $p<\alpha$ may be understood that the two datasets are statistically dissimilar and that the data model for the synthetic dataset needs to be modified.

Further, as described herein, the distributions of numerical values may take different forms (e.g., normal, Benford, triangular, Poisson, uniform, or other distributions). To account for different distributions, the calculation of the p-value may be performed by other tests including, for example, the chi-squared test, the Mann-Whitney U test, or the g-test.

The Mann-Whitney U test may be performed by converting data into ranks and analyzing the difference between the rank totals, resulting in a statistic, U. The smaller the U, the less likely differences have occurred by chance. Determining whether something is significant with the Mann-Whitney U test may involve the use of different tables that provide a critical value of U for a particular significance level. The critical value may vary depending on the significance level chosen as well as the number of participants in each group (which is not required to be equal for this test).

In the chi-squared test, also written as the $x2$ test, is any statistical hypothesis test where the sampling distribution of the test statistic is a chi-squared distribution when the null hypothesis is true. The chi-squared test may be used to determine whether there is a significant difference between the expected frequencies and the observed frequencies in one or more categories. Generally, observations are classified into mutually exclusive classes. The null hypothesis is used to provide the probability that any observation falls into the corresponding class. The purpose of the chi-squared test is to evaluate how likely the observations that are made would be possible, assuming the null hypothesis is true.

Chi-squared tests may be constructed from a sum of squared errors, or through the sample variance. Test statistics that follow a chi-squared distribution arise from an assumption of independent normally distributed data, which is valid in many cases due to the central limit theorem. A chi-squared test can be used to attempt rejection of the null hypothesis that the data are independent. Using the chi-squared test, the additional synthetic data may be compared against the existing synthetic dataset to determine whether the additional synthetic dataset is statistically similar to the existing synthetic dataset (e.g., within a 95% probability that the datasets are similar). The threshold for similarity may be adjusted as desired.

Further, the comparisons between the datasets may include comparing the original synthetic dataset with the additional synthetic dataset, comparing the original synthetic dataset with a combined dataset comprising the original synthetic dataset and the additional synthetic dataset, and/or comparing the additional synthetic dataset with a combined dataset comprising the original synthetic dataset and the additional synthetic dataset, and/or combinations of these comparisons.

Additional synthetic data may be generated and compared to the data model as described with respect to steps 406-409. In step 410, if the model is complete, the model may be deployed in step 412. Various examples of how a model may be deployed are shown in step 412 and include database tuning 413, machine learning 414, and algorithm tuning (e.g., tuning how search engines find desired data—sometimes referred to as search engine optimization) 415.

Figure 5:
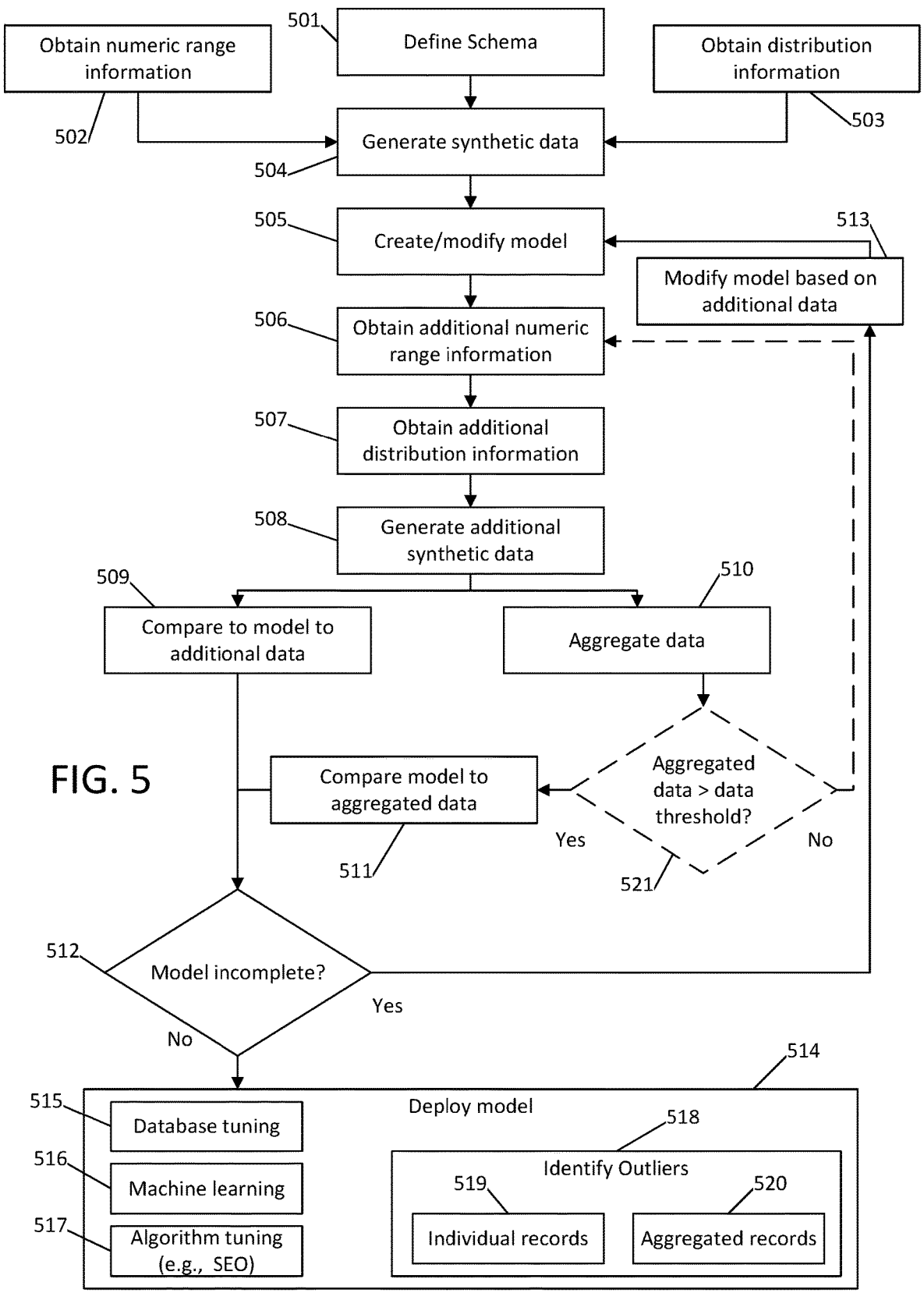
FIG. 5 depicts a flow chart for a method of generating synthetic data and modeling a database using individual synthetic data and aggregated synthetic data.

FIG. 5 depicts a flow chart for a method of generating synthetic data and modeling a database using individual synthetic data and aggregated synthetic data. In step 501, a schema is defined a schema is defined as including the distribution for numeric values. In step 502, numeric range information is obtained separately from the obtaining of schema 501. In step 503, distribution information is obtained separately from the schema defined in step 501. Additionally or alternatively, the numeric range or the distribution information may be combined into schema 501 and obtained with it. In step 504, synthetic data is generated based on the schema, the numeric range, and the distribution information. In step 505, a new database model may be created or an existing database model modified based on newly added synthetic data. In step 506, additional numeric range information may be obtained. In step 507, additional distribution information may be obtained. In step 508, based on the additional numeric range information and the additional distribution information, additional synthetic data may be generated.

In steps 509 through 511, the additional synthetic data may be compared to the database model. In step 509, the additional synthetic data may be compared as described above with respect to step 409 in FIG. 4. In step 510, the additional synthetic data generated in step 508 may be aggregated with the synthetic data generated in step 504. In step 511, the model may be compared to the aggregated data. By comparing the model to the aggregated synthetic data, additional variations (or lack of variations) may be found.

Shown in dashed lines, an additional determination (step 521) may be made after step 510 and before step 511 as to whether the aggregated data satisfies a minimum data threshold for before comparing the model to the aggregated data from step 510.

When modeling based on small datasets, the initial conclusions that a model needs to be changed may be skewed based on the Law of Small Numbers (referring to the fallacy of reaching an inductive generalization based on insufficient evidence). With respect to a data model based on a first synthetic dataset, determining that the model is faulty may be overly biased by large differences between the first synthetic dataset and subsequently generated synthetic datasets. In an example where a numerical mean for a first dataset is 480 while a numerical mean for a second dataset is 520, concluding that the data model's tuning to numerical mean of 480 is significantly skewed (e.g., off by a value of 40) may be premature in that only two datasets are available. By aggregating multiple datasets, the variances between datasets may even out in the aggregate (e.g., with numerical means of a third, fourth, and fifth datasets being 490, 510, and 500, respectively) to a more realistic value (e.g., a numerical mean of 500 determined through the aggregation of the first through fifth datasets). This aggregation may reduce the likelihood of unnecessarily modifying then re-modifying a data model until enough data sets have been aggregated.

In step 512, if the model is incomplete (the existing model performing below expectations), the model may be modified, in step 513, based on the additional synthetic data. Next, additional synthetic data may be generated and compared to the data model as described with respect to steps 506-511. In step 512, if the model is complete, the model may be deployed in step 514. Various examples of how a model may be deployed are shown in step 514 and include database tuning 515, machine learning 516, and algorithm tuning (e.g., tuning how search engines find desired data—sometimes referred to as search engine optimization) 517. Further, the model may permit the identification of outliers as step 518.

In step 518, the identification of outliers may have two forms: comparing individual records against the model to determine outliers and comparing aggregated records against the model to determine outliers. For example, in comparing individual records (step 519), a processor may compare each numerical field in a record against the numerical mean of the data model and determine how many standard deviations that value is from the numerical mean of the data model for that field. Values identified as more than a given number (e.g. three) of standard deviations may be identified for further review (e.g., an alert may be generated that identifies the record, the value, and the cause for the alert—and the alert sent to an operator and/or saved in a set of records to be reviewed.

In step 520, aggregated records may be compared against the data model. Aggregated data have comparable properties not found in a single value of data including, for instance, a numerical mean, a numerical mode, and medium (a single row of data may be considered to have trivial values of a numerical mean, numerical mode, and medium). In aggregated data, the numerical mode, numerical mean, head, tail, median, variance, standard deviation, symmetry, skewness, kurtosis, and/or other parameters may be determined and compared to those values in the data model. As the data model grows, adding in aggregated synthetic data helps identify where the model may need to be adjusted.

Figure 6:
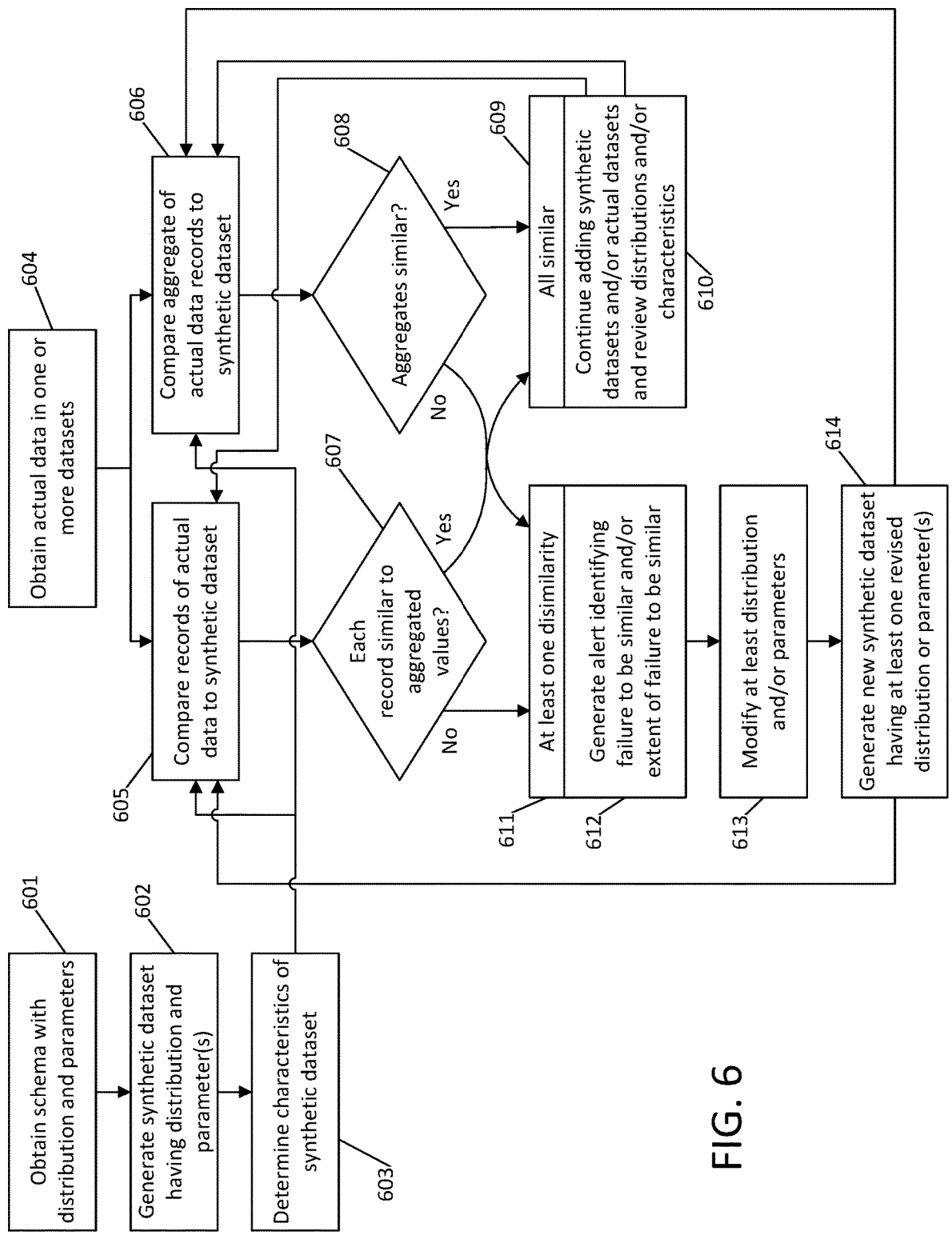
FIG. 6 depicts a flow chart for a method of generating synthetic data and analyzing actual data using the synthetic data.

FIG. 6 depicts a flow chart for a method of generating synthetic data and analyzing actual data using the synthetic data. In step 601, a schema is obtained that identifies a distribution for a numeric value. Also, parameters are obtained regarding that numeric value. The parameters may be identified in the schema or may be specified elsewhere (e.g., when wanting to modify the parameters per data set or aggregated data sets or sets). In step 602, a synthetic dataset is generated as having the distribution identified in the schema obtained in step 601 and the parameters (either specified in the schema or obtained from a separate storage). In step 603, characteristics of the synthetic data may be determined by statistically analyzing the synthetic dataset. The characteristics may include any parameters not specified in step 601 and used to generate the synthetic dataset in step 602. For example, while a numerical mode may be specified in step 601, the median may not be specified and the median subsequently calculated in step 603. The term "characteristics" may be applied to both parameters that are used to generate the synthetic datasets and/or to parameters subsequently determined based on a statistical analysis of the synthetic datasets. Synthetic data distribution parameters for non-uniform distributions may include relatively few parameters. For a Gaussian distribution, the mean and standard deviation may be used while other parameters including skewness or kurtosis are not used as those parameters may have no relevance to that type of distribution. For a triangular distribution, the parameters may include a minimum, maximum, and mode. While the skewness of the distribution may be algorithmically fixed, the skewness may be subsequently measured. The term "characteristics" may also be applied to parameters determined based on a statistical analysis of actual datasets.

In step 604, actual (real-world) data may be obtained from one or more storages (e.g., from one or more databases). In step 605, records of the actual data may be compared to the synthetic datasets (e.g., the number of standard deviations separating a numerical value of a record may be determined and compared to the numerical mean of the data model). In step 606, the actual data may be aggregated into datasets and those datasets compared against the synthetic data sets.

In step 607, the process determines whether each of the numeric values in an actual data record is similar to the values in the synthetic datasets (e.g., each of the records is within a low number of standard deviations from the numerical mean of the synthetic dataset). If each of the actual records is determined in step 607 to be statistically similar to (e.g., within a 95% probability confidence level) the synthetic dataset (step 609), synthetic datasets and/or actual datasets may be added and the newly added records may be subsequently reviewed to determine whether individual records contain outliers (step 610) (returning to step 605).

If at least one of the actual records is determined in step 607 to be different from the aggregated values in the synthetic dataset (e.g., differing by four or more standard deviations) (step 611), then in step 612 an alert may be generated. The alert may identify record and/or provide an indication of how that record is dissimilar (e.g., the number of standard deviations different from the numerical mean of the synthetic data). In step 613, one or more of the distribution and/or the parameters of the synthetic data may be modified to more closely approximate the actual data. In step 614, a new synthetic dataset may be generated based on at least one of a revised distribution or parameter. The actual data may be compared with the new synthetic dataset in steps 605 and 606.

In step 608, the process determines whether aggregate records of actual data are similar to aggregated values from the synthetic dataset (e.g., comparing the distributions, numerical modes, medians, numerical means, symmetry, skewness, kurtosis, and other parameters). If the actual aggregated records are determined in step 608 to be similar to the synthetic dataset (step 609), additional synthetic datasets and/or actual datasets may be added and aggregated with the existing synthetic and/or actual data (in step 610). The newly added aggregates may be subsequently reviewed to determine whether the aggregated datasets contain outliers.

If the aggregate actual data contains at least one dissimilar feature (e.g., distribution and/or parameter) (step 611), then in step 612 an alert may be generated. The alert may identify the aggregate and/or provided indication of how the aggregate is dissimilar from the synthetic data. For example, the indication may include how the distribution of the aggregate actual data is statistically different from the distribution of the synthetic data. Additionally or alternatively, other indications may identify how one or more of parameters differ between the aggregate actual data and the synthetic data, including the numerical mean, numerical mode, head, tail, median, variance, standard deviation, symmetry, skewness, kurtosis, and/or other parameters.

In step 613, one or more of the distribution and/or the parameters of the synthetic data may be modified to more closely approximate the aggregate actual data. In step 614, a new synthetic dataset may be generated based on at least one of a revised distribution or parameter or parameters. The aggregate actual data may be compared with the new synthetic dataset in steps 605 and 606.

Figure 7:
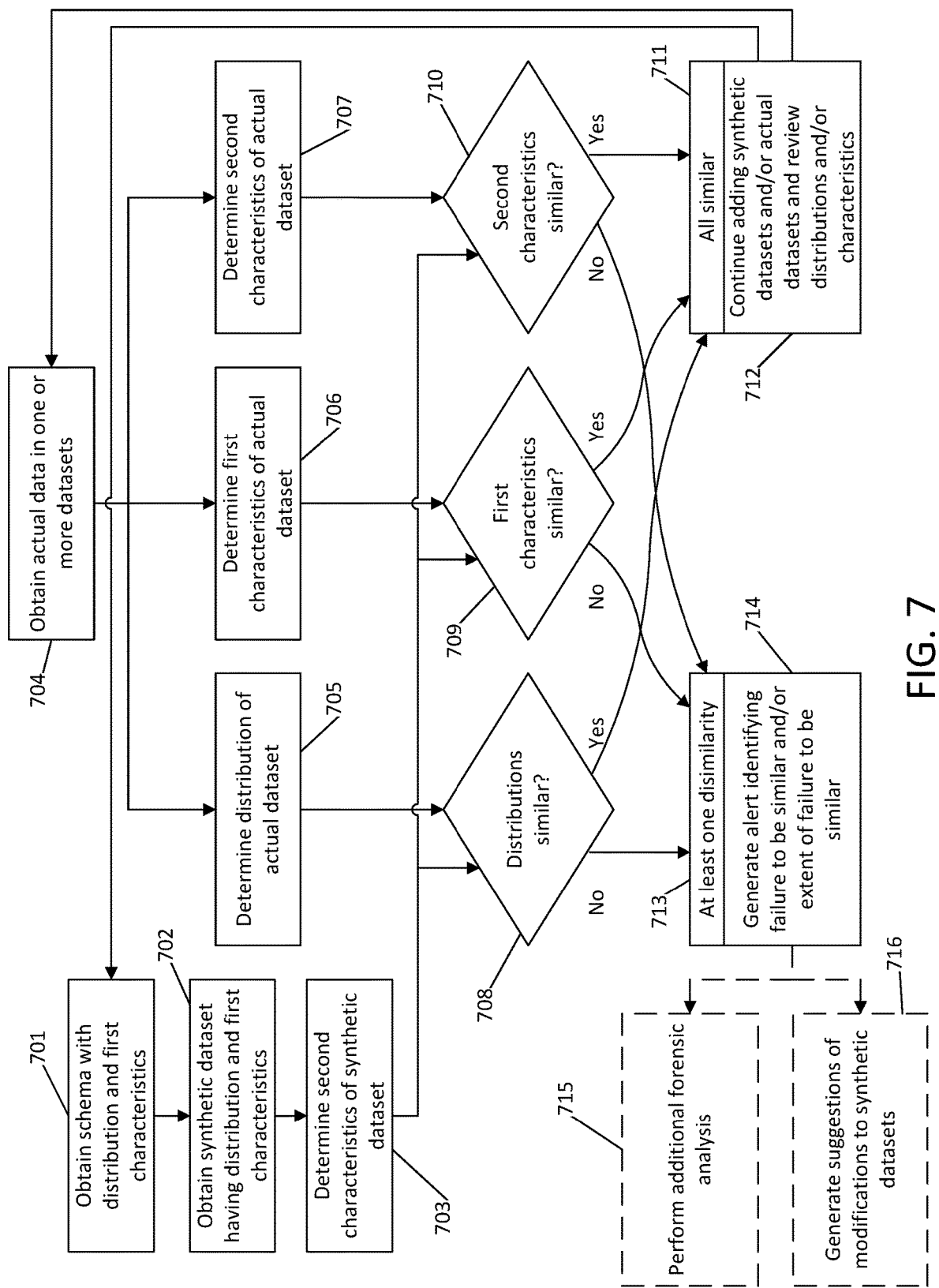
FIG. 7 depicts a flow chart for another method of generating synthetic data and analyzing actual data using the synthetic data.

FIG. 7 depicts a flow chart for another method of generating synthetic data and analyzing actual data using the synthetic data. In step 701, a schema is obtained that identifies a distribution for a numeric value. Also, parameters are obtained regarding that numeric value. The parameters may be identified in the schema or may be specified elsewhere (e.g., when wanting to modify the parameters per data set or aggregated data sets or sets). In step 702, a synthetic dataset is generated as having the distribution identified in the schema obtained in step 701 and the parameters (either specified in the schema or obtained from a separate storage). In step 703, characteristics of the synthetic data may be determined by statistically analyzing the synthetic dataset. The characteristics may include any parameters not specified in step 701 and used to generate the synthetic dataset in step 702. For example, while a numerical mode may be specified in step 701, the median may not be specified and the median subsequently calculated in step 703.

In step 704, actual (real-world) data may be obtained from one or more storages (e.g., from one or more databases). In step 705, the distribution of the actual dataset is determined. In step 706, first characteristics of the actual dataset are determined. The first characteristics may include the numerical mean, numerical mode, head, tail, median, variance, standard deviation, symmetry, skewness, kurtosis, and/or other parameters. Alternatively, the first characteristics made only include a subset of parameters (e.g., the numerical mean and/or numerical mode). In step 707, second characteristics of the actual dataset may be determined. The second characteristics may be determined separately (in step 707) then the determination of the first characteristics (in step 706) due to one or more considerations regarding the second characteristics. For example, initially, when the volume of actual data is low, the ability of a system to determine the symmetry of the data, based on the low volume of data, may be limited. In this example, the determination of the second characteristics of the actual dataset in step 707 may be delayed until after additional actual datasets have been included. Additionally and/or alternatively, the distribution of the actual dataset in step 705 may be delayed until after additional actual datasets have been added.

In step 708, the distribution of the synthetic dataset may be compared with the distribution of the actual dataset as determined in step 705. In step 709, the first characteristics of the synthetic dataset may be compared with those of the actual dataset as determined in step 706. In step 710, the second characteristics of the synthetic dataset may be compared with those of the actual dataset as determined in step 707. For example, a first characteristic compared between the datasets may be the numerical mean of each dataset. Also, a second characteristic compared between the datasets may be the kurtosis of each dataset (e.g., comparing the sharpness of peaks in the respective datasets).

In the situation where each of the distributions, the first characteristics, and the second characteristics are considered statistically similar (step 711) (e.g., for compared characteristics, that the two datasets have a high probability of being equivalent), at least one additional synthetic dataset or actual dataset may be generated or added and the distributions and/or characteristics reviewed again (step 712 and including steps 701/704 as relevant).

If the actual data's distribution, first characteristic, and/or second characteristic contains at least one dissimilar feature (e.g., distribution and/or parameter) from that of the synthetic data (step 713), then in step 714 an alert may be generated. The alert may identify the aggregate and/or provided indication of how the actual is dissimilar from the synthetic data. For example, the indication may include how the distribution of the actual data is statistically different from the distribution of the synthetic data. Additionally or alternatively, other indications may identify how one or more of the characteristics differ between the actual data and the synthetic data, including the numerical mean, numerical mode, head, tail, median, variance, standard deviation, symmetry, skewness, kurtosis, and/or other parameters.

In one example, additional forensic analysis may be performed in step 715 on the actual data, based on the alert from step 714. The additional forensic analysis may include regression techniques (e.g., linear regression models, discrete choice models, logistic regression models, multinomial models, logistic regression models, probit regression models, time series models, time-to-event models, classification and regression trees, and/or multivariate adaptive regression splines) or machine learning techniques (e.g., neural networks, multilayer perceptron, radial basis functions, support vector machines, naïve Bayes, k-nearest neighbors, and/or geospatial productive modeling). In another example, suggestions may be generated in step 716 to more closely model the synthetic data to the actual data.

Forensic analyses are generally performed by matching a dataset to specific patterns associated with fraudulent data. This approach may be time and resource intensive for large datasets.

Figure 8:
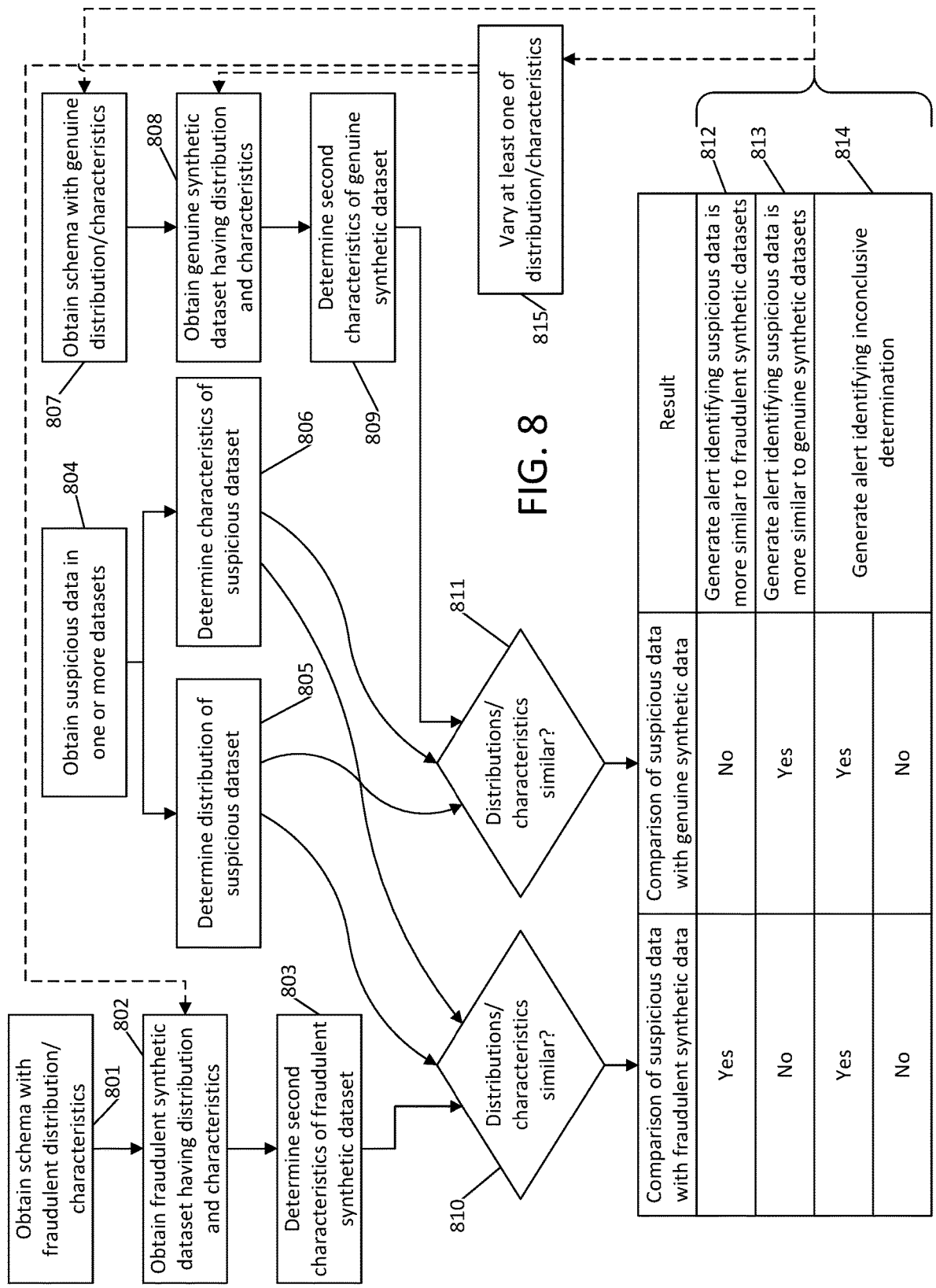
FIG. 8 depicts a flow chart for a method of generating synthetic data and analyzing actual data using the synthetic data.

FIG. 8 depicts a flow chart for a method of analyzing a suspicious dataset (referred to herein as the dataset to be analyzed) against two or more synthetic datasets. Comparing the suspicious dataset to two or more synthetic datasets may, for the size of the suspicious dataset, be more efficient.

Genuine synthetic data may comprise data generated based on a schema identifying a distribution and characteristics appropriate for a given data field. For example, for house numbers, a Benford distribution may be identified and associated characteristics for house numbers (e.g., based on analysis of existing house numbers). Fraudulent synthetic data may comprise synthetic data that is generated based on distributions and/or characteristics known not to occur in actual data for a numerical field. For example, street addresses are known to follow a Benford distribution. A fraudulent synthetic dataset for street addresses may have a uniform distribution while a genuine synthetic dataset for street addresses may have a Benford distribution. Also, as telephone numbers are known to not follow a Benford distribution, a fraudulent synthetic dataset for telephone numbers may have a Benford distribution while a genuine synthetic dataset for telephone numbers may have a different distribution (e.g., uniform for all digits or uniform for some but not all digits—like "0" and "1" digits occurring more often or less often in certain digit locations). Further, exchange rates, price indices, and stock market indices generally follow the log-normal distribution. A fraudulent synthetic dataset for exchange rates, price indices, or stock market indices may have a non-log-normal distribution while a genuine synthetic dataset for exchange rates, price indices, or stock market indices may follow the log-normal distribution.

FIG. 8 depicts the process as generating two synthetic datasets from two different schemas: one schema properly modeling a numerical field (e.g., a correct numerical distribution and accurate mean, mode, and median, etc.) and the other schema improperly modeling that numerical field (e.g., an incorrect numerical distribution and/or skewed mean, mode, median, etc.). Next, the process compares the suspicious dataset to each of the properly modeled dataset and the improperly modeled dataset. Based on that comparison, the process may return a conclusion that the suspicious data matches one of the two synthetic datasets (and not the other) or the results are inconclusive and returns for more dataset generation and comparison.

In addition, characteristics may be used to define synthetic data as fraudulent. For example, a schema for the generation of fraudulent synthetic data may identify a parameter that is skewed compared to actual data (e.g., a high average per-transaction dollar amount for a given store of a company while other stores of that company have a low average per-transaction dollar amount) while a schema for the generation of genuine synthetic data may identify a parameter that comports with the actual data (e.g., a low average per-transaction dollar amount for a store).

In step 801, a schema for the generation of fraudulent synthetic data is obtained. That schema identifies a distribution for a numeric value. Also, characteristics are obtained regarding that numeric value. The characteristics may be identified in the schema or may be specified elsewhere (e.g., when wanting to modify the parameters per data set or aggregated data sets or sets). In step 802, a fraudulent synthetic dataset is generated as having the distribution identified in the schema obtained in step 801 and the characteristics (either specified in the schema or obtained from a separate storage). In step 803, additional characteristics of the fraudulent synthetic data may be determined by statistically analyzing the fraudulent synthetic dataset. The characteristics may include any parameters not specified in step 801 and used to generate the synthetic dataset in step 802. For example, while a numerical mode may be specified in step 801, the median may not be specified and the median subsequently calculated in step 803.

In step 804, actual (real-world) data may be obtained from one or more storages (e.g., from one or more databases). In step 805, the distribution of the actual dataset is determined. In step 806, characteristics of the actual dataset are determined. The characteristics may include the numerical mean, numerical mode, head, tail, median, variance, standard deviation, symmetry, skewness, kurtosis, and/or other parameters. Additionally and/or alternatively, the distribution of the actual dataset in step 805 and/or one or more of the characteristics determined in step 806 may be delayed until after additional actual datasets have been added.

In step 807, a schema for the generation of genuine synthetic data is obtained. That schema identifies a distribution for a numeric value. Also, characteristics are obtained regarding that numeric value. The characteristics may be identified in the schema or may be specified elsewhere (e.g., when wanting to modify the parameters per data set or aggregated data sets or sets). In step 808, a genuine synthetic dataset is generated as having the distribution identified in the schema obtained in step 807 and the characteristics (either specified in the schema or obtained from a separate storage). In step 809, additional characteristics of the genuine synthetic data may be determined by statistically analyzing the genuine synthetic dataset. The characteristics may include any parameters not specified in step 807 and used to generate the synthetic dataset in step 808. For example, while a numerical mode may be specified in step 807, the median may not be specified and the median subsequently calculated in step 809.

In step 810, the distribution and/or characteristics are compared for similarity between the fraudulent synthetic dataset and the actual dataset. In step 811, the distribution and/or characteristics are compared for similarity between the genuine synthetic dataset and the actual dataset. The results of the comparisons may be used to determine whether the difference or differences between the fraudulent synthetic dataset and the genuine synthetic dataset are distinct enough to permit a determination of whether the actual dataset is more similar to one synthetic dataset than the other synthetic dataset. For instance, where the actual dataset is closer (e.g., same distribution and/or one or more similar parameters) to the data in the fraudulent synthetic dataset while being different from the data in the genuine synthetic dataset (e.g., different distribution and/or one or more statistically distinct parameters), then an alert may be generated in step 812 that indicates that the actual dataset may be fraudulent. Conversely, where the actual dataset is closer (e.g., same distribution and/or one or more similar parameters) to the data in the genuine synthetic dataset while being different from the data in the fraudulent synthetic dataset (e.g., different distribution and/or one or more statistically distinct parameters), then an alert may be generated in step 813 that indicates that the actual dataset may be genuine. However, where the actual dataset is statistically similar to that of both the fraudulent synthetic dataset and the genuine synthetic dataset or where the actual dataset is statistically different from each of the fraudulent synthetic dataset and the genuine synthetic dataset, an alert may be generated in step 814 that indicates that the actual dataset cannot be determined to be fraudulent or genuine based on the current fraudulent and genuine synthetic datasets.

The process of FIG. 8 may conclude at the alerts generated in any of steps 812, 813, or 814. Alternatively, the process may continue shown by the dashed lines returning to earlier steps. For example, if one or more genuine synthetic datasets are to be generated an compared against the suspicious dataset, the process may return to step 807 and, using the existing genuine schema, generate a new genuine synthetic dataset in step 808. In another example, the existing schemas (e.g., obtained in one or more of steps 801 or 807) may be modified in step 815 and one or more new synthetic datasets may be generated with the modified schema. For instance, only a new fraudulent synthetic dataset may be generated step 802 or only a new genuine synthetic dataset may be generated in step 808. Additionally or alternatively, both a new fraudulent synthetic dataset may be generated step 802 and a new genuine synthetic dataset may be generated in step 808. Second characteristics may be determined (in steps 803 and/or 809) pertaining to the new synthetic dataset or synthetic datasets.

FIG. 8 depicts the suspicious dataset being compared to two or more synthetic datasets, generated from schema, and possibly concluding that the suspicious dataset contains actual data, synthetic data, or requires further comparisons. Alternatively or additionally, comparisons using only one side of FIG. 8 may also be implemented. For example, the genuine dataset (e.g., the dataset 808) may be generated and compared with the suspicious dataset in step 811, without the generation of the fraudulent dataset 802 and related comparison 810. Further, additional generation/comparison iterations may be performed by regenerating the genuine dataset 808, determining its characteristics, and comparing it with the suspicious dataset until the suspicious dataset is found to be statistically similar to the genuine dataset 808 (first or subsequent iterations) or not found after a given number of iterations (e.g., 2, 10, 100, 1000, etc.). Alternatively or additionally, comparisons using only the other side of FIG. 8 may also be implemented. For example, the fraudulent dataset (e.g., the dataset 802) may be generated and compared with the suspicious dataset in step 810, without the generation of the genuine dataset 808 and related comparison 811. Further, additional generation/comparison iterations may be performed by regenerating the fraudulent dataset 802, determining its characteristics, and comparing it with the suspicious dataset until the suspicious dataset is found to be statistically similar to the fraudulent dataset 802 (first or subsequent iterations) or not found after a given number of iterations (e.g., 2, 10, 100, 1000, etc.). In either approach, the table at the bottom of FIG. 8 may be reduced to the binary options in the column related to the comparison step (e.g., the "Comparison of suspicious data with fraudulent synthetic data" column and step 810 or the "Comparison of suspicious data with genuine synthetic data" column and step 811).

A real-world example includes checking reported fund values (the "suspicious dataset") against statistically relevant and statistically irrelevant synthetic datasets to determine whether reported values (i.e., the suspicious dataset with the reported fund values) are more likely genuine or fraudulent. In other words, the process of FIG. 8 may be used to detect securities fraud.

Another real-world example includes checking database content from datasets to be imported from another entity. For example, mergers and acquisitions between financial institutions often require consolidation of legacy databases to support customers of the merged entities. Each database is unique in its size, schema, data formats, datatypes, and the like. Merging databases merely based on column headers is problematic, requiring repeated massaging of data before the combined database is ready for deployment. The process described in FIG. 8 may be used to help determine whether identified fields in a database (e.g., of an acquired company—hereinafter "the acquired database") to be merged into an existing or new database comport with the values expected for the columns of the existing or new database. For example, the content of one or more columns of the acquired database may be the suspicious dataset (e.g., a columns "amount" and "date" of the acquired database may be intended to be added to columns "existing loan amount" and "statement date"). Schemas for the content of columns in the existing or new database may be created that describe the expected content for those columns (using, for instance, the processes of FIGS. 2-7). Statistically relevant and statistically irrelevant synthetic datasets may be created from those schemas. The suspicious dataset may be compared against the statistically relevant and statistically irrelevant synthetic datasets to determine whether the content of the columns of the acquired database (i.e., the suspicious dataset) are more likely to represent actual data or are not appropriate for the identified column or columns of the existing or new database. While the suspicious dataset may represent actual data from the acquired dataset and not fraudulent data, the process of FIG. 8 may identify whether placing the data from the acquired dataset belongs in the identified column or columns (e.g., for the above example, the "amount" and "date" columns may be better mapped to "payment amount" and "payment receipt date"). Alternatively or additionally, by repeatedly comparing the suspicious dataset against other columns in the existing or new database, a better match for the suspicious dataset may be found. In other words, the process of FIG. 8 may be used to help integrate databases.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for comparing synthetic data and actual data, the method comprising:
receiving an identification of a first field of a database, the first field representing actual data and the identification including a first numerical distribution and a first characteristic;
receiving a first dataset having data identified by the first field;
receiving a first schema with the first numerical distribution and the first characteristic;
generating, based on the first schema, a second dataset having the first numerical distribution and the first characteristic, the second dataset comprising synthetic data;
receiving a second schema with a second numerical distribution and a second characteristic, wherein the second numerical distribution differs from the first numerical distribution, and wherein the second characteristic differs from the first characteristic;
generating, based on the second schema, a third dataset having the second numerical distribution and the second characteristic, the third dataset comprising synthetic data;
determining, for the first dataset, a third numerical distribution and a third characteristic;
comparing the first dataset with the second dataset;
determining, whether the first dataset is statistically different from the second dataset;
comparing the first dataset with the third dataset;
determining, whether the first dataset is statistically different from the third dataset; and
generating, based on determining that the first dataset is statistically different from the second dataset and statistically similar to the third dataset, an alert that the first dataset does not represent actual data.

2. The method of claim 1, further comprising:
receiving a third schema with a fourth numerical distribution and a fourth characteristic;
generating, based on the third schema, a fourth dataset having the fourth numerical distribution and the fourth characteristic;
generating, based on the first schema, a fifth dataset having the first numerical distribution and the first characteristic;
comparing the first dataset with the fourth dataset;
determining, whether the first dataset is statistically different from the fourth dataset;
comparing the first dataset with the fifth dataset;
determining, whether the first dataset is statistically different from the fifth dataset; and
generating, based on determining that the first dataset is statistically different from the fifth dataset and statistically similar to the fourth dataset, an alert that the first dataset does not represent actual data.

3. The method according to claim 1,
wherein each of the first schema and the second schema is a JSON schema,
wherein the JSON schema includes a numerical distribution as part of an object definition, and
wherein the JSON schema includes a characteristic as part of the object definition.

4. The method according to claim 1,
wherein the first numerical distribution of values is one of a normal distribution, a Benford distribution, binomial distribution, power distribution, or a triangular distribution.

5. The method according to claim 1, wherein comparing the first dataset with the second dataset further comprises:

determining whether the third numerical distribution is statistically different from the first numerical distribution by determining a number of standard deviations separating a numerical mean of the first dataset from the numerical mean of the second dataset.

6. The method according to claim 1, wherein determining whether the second numerical data is statistically different from the first numerical data further comprises:
   determining the second numerical data is statistically different from the first numerical data at least as comprising a statistically different numerical mode, median, symmetry, skewness, or kurtosis.

7. The method according to claim 1, further comprising:
   receiving first distribution parameters further defining the first numerical distribution;
   receiving second distribution parameters further defining the second numerical distribution,
   wherein the generating the second dataset further comprises generating the second dataset conforming to the first numerical distribution, the first characteristic, and the first distribution parameters, and
   wherein the generating the third dataset further comprises generating the third dataset conforming to the second numerical distribution, the second characteristic, and the second distribution parameters.

8. The method according to claim 1,
   wherein the first characteristic comprises an a first identification and a first value associated with the identification, the identification comprising at least one of a mode, a median, or a mean,
   wherein the second characteristic comprises the first identification and a second value, and
   wherein the second value is statistically different from the first value,
   wherein the determining the third numerical distribution and the third characteristic further comprises determining the first identification for the first dataset and a third value,
   wherein the comparing the first dataset with the second dataset further comprises comparing the third value with the first value, and
   wherein the comparing the first dataset with the third dataset further comprises comparing the third value with the second value.

9. The method according to claim 1, further comprising:
   determining, for the first dataset, a first standard deviation;
   determining, for the second dataset, a second standard deviation; and
   determining, for the third dataset, a third standard deviation;
   wherein the comparing the first dataset with the second dataset further comprises comparing the first standard deviation and the second standard deviation, and
   wherein the comparing the first dataset with the third dataset further comprises comparing the first standard deviation and the third standard deviation.

10. A system for comparing synthetic data and actual data, the system comprising:
    a first database configured to store records;
    a storage configured to store a first file, the first file containing a first schema definition, the first schema definition including:
       a first schema with the first numerical distribution and the first characteristic; and
       a second schema with a second numerical distribution and a second characteristic,
    wherein the second numerical distribution differs from the first numerical distribution, and
    wherein the second characteristic differs from the first characteristic;
    one or more processors; and
    memory storing instructions that, when executed by the one or more processors, cause the system to:
       receive an identification of a first field of a database, the first field representing actual data and the identification including a first numerical distribution and a first characteristic;
       receive a first dataset having data identified by the first field;
       generate, based on the first schema, a second dataset having the first numerical distribution and the first characteristic, the second dataset comprising synthetic data;
       generate, based on the second schema, a third dataset having the second numerical distribution and the second characteristic, the third dataset comprising synthetic data;
       determine, for the first dataset, a third numerical distribution and a third characteristic;
       compare the first dataset with the second dataset;
       determine, whether the first dataset is statistically different from the second dataset;
       compare the first dataset with the third dataset;
       determine, whether the first dataset is statistically different from the third dataset;
       generate, based on the determination that the first dataset is statistically different from the second dataset and statistically similar to the third dataset, an alert that the first dataset is more statistically similar to the third dataset than to the second dataset; and
       recursively generate additional datasets based on variations of the second schema, compare the first dataset to the additional datasets, determine that the first dataset is statistically more similar to one or more of the additional datasets, and generate an alert identifying the additional datasets and the variations of the second schema used to generate the additional datasets.

11. The system according to claim 10, wherein the instructions further cause the one or more processors to recursively generate, determine, and generate further comprises:
    receive a third schema with a fourth numerical distribution and a fourth characteristic;
    generate, based on the third schema, a fourth dataset having the fourth numerical distribution and the fourth characteristic;
    generate, based on the first schema, a fifth dataset having the first numerical distribution and the first characteristic;
    compare the first dataset with the fourth dataset;
    determine whether the first dataset is statistically different from the fourth dataset;
    compare the first dataset with the fifth dataset;
    determine whether the first dataset is statistically different from the fifth dataset; and
    generate, based on the determination that the first dataset is statistically different from the fifth dataset and statistically similar to the fourth dataset, an alert that the first dataset does not represent actual data.

12. The system according to claim 10,
    wherein each of the first schema and the second schema is a JSON schema, wherein the JSON schema includes a numerical distribution as part of an object definition, and
wherein the JSON schema includes a characteristic as part of the object definition.

13. The system according to claim 10,
wherein the first numerical distribution of values is one of a normal distribution, a Benford distribution, binomial distribution, power distribution, or a triangular distribution.

14. The system according to claim 10, wherein the instructions cause the one or more processors to compare the first dataset with the second dataset by causing the one or more processors to:
determine a number of standard deviations separating a numerical mean of the first dataset from the numerical mean of the second dataset; and
determine, based on the determination of the number of standard deviations, whether the third numerical distribution is statistically different from the first numerical distribution.

15. The system according to claim 10,
wherein the instructions to determine whether the second numerical data is statistically different from the first numerical data further cause the one or more processors to:
determine the second numerical data is statistically different from the first numerical data at least as comprising a statistically different numerical mode, median, symmetry, skewness, or kurtosis.

16. The system according to claim 10, wherein the instructions further cause the one or more processors to:
receive first distribution parameters further defining the first numerical distribution; and
receive second distribution parameters further defining the second numerical distribution,
wherein the instructions to generate the second dataset further comprise instructions to generate the second dataset conforming to the first numerical distribution, the first characteristic, and the first distribution parameters, and
wherein the instructions to generate the third dataset further cause the one or more processors to generate the third dataset conforming to the second numerical distribution, the second characteristic, and the second distribution parameters.

17. The system according to claim 10,
wherein the first characteristic comprises a first identification and a first value associated with the identification, the identification comprising at least one of a mode, a median, or a mean,
wherein the second characteristic comprises the first identification and a second value,
wherein the second value is statistically different from the first value,
wherein the instructions to determine the third numerical distribution and the third characteristic further cause the one or more processors to determine the first identification for the first dataset and a third value,
wherein the instructions to compare the first dataset with the second dataset further cause the one or more processors to compare the third value with the first value, and
wherein the instructions to compare the first dataset with the third dataset further cause the one or more processors to compare the third value with the second value.

18. The system according to claim 10,
determine, for the first dataset, a first standard deviation;
determine, for the second dataset, a second standard deviation; and
determine, for the third dataset, a third standard deviation;
wherein the instructions to compare the first dataset with the second dataset further cause the one or more processors to compare the first standard deviation and the second standard deviation, and
wherein the instructions to compare the first dataset with the third dataset further cause the one or more processors to compare the first standard deviation and the third standard deviation.

19. One or more non-transitory media storing instructions that, when executed by one or more processors, cause the one or more processors to perform steps comprising:
receiving an identification of a first field of a database, the first field representing actual data and the identification including a first numerical distribution and a first characteristic;
receiving a first dataset having data identified by the first field;
receiving a first schema with the first numerical distribution and the first characteristic;
generating, based on the first schema, a second dataset having the first numerical distribution and the first characteristic, the second dataset comprising synthetic data;
receiving a second schema with a second numerical distribution and a second characteristic, wherein the second numerical distribution differs from the first numerical distribution, and wherein the second characteristic differs from the first characteristic;
generating, based on the second schema, a third dataset having the second numerical distribution and the second characteristic, the third dataset comprising synthetic data;
determining, for the first dataset, a third numerical distribution and a third characteristic;
comparing the first dataset with the second dataset;
determining, whether the first dataset is statistically different from the second dataset;
comparing the first dataset with the third dataset;
determining, whether the first dataset is statistically different from the third dataset;
generating, based on determining that the first dataset is statistically different from the second dataset and statistically similar to the third dataset, an alert that the first dataset does not represent actual data;
receiving a third schema with a fourth numerical distribution and a fourth characteristic;
generating, based on the third schema, a fourth dataset having the fourth numerical distribution and the fourth characteristic;
generating, based on the first schema, a fifth dataset having the first numerical distribution and the first characteristic;
comparing the first dataset with the fourth dataset;
determining, whether the first dataset is statistically different from the fourth dataset;
comparing the first dataset with the fifth dataset;
determining, whether the first dataset is statistically different from the fifth dataset; and
generating, based on determining that the first dataset is statistically different from the fifth dataset and statistically similar to the fourth dataset, an alert that the first dataset does not represent actual data;
wherein each of the first schema and the second schema is a JSON schema, wherein the JSON schema includes a numerical distribution as part of an object definition, and wherein the JSON schema includes a characteristic as part of the object definition.

* * * * *